United States Patent
Löfqvist

(10) Patent No.: US 12,065,317 B2
(45) Date of Patent: Aug. 20, 2024

(54) PALLET TRANSFER DEVICE FOR ROBOT PALLETIZING, A SYSTEM FOR ROBOT PALLETIZING INCLUDING THE PALLET TRANSFER DEVICE AND A METHOD FOR ROBOT PALLETIZING

(71) Applicant: Robotautomation Svenska AB, Örebro (SE)

(72) Inventor: Johan Löfqvist, Örebro (SE)

(73) Assignee: ROBOTAUTOMATION SVENSKA AB, Örebro (SE)

( * ) Notice: Subject to any disclaimer, the term of this patent is extended or adjusted under 35 U.S.C. 154(b) by 0 days.

(21) Appl. No.: 18/033,347

(22) PCT Filed: Oct. 7, 2021

(86) PCT No.: PCT/EP2021/077730
§ 371 (c)(1),
(2) Date: Apr. 23, 2023

(87) PCT Pub. No.: WO2022/148561
PCT Pub. Date: Jul. 14, 2022

(65) Prior Publication Data
US 2023/0391561 A1    Dec. 7, 2023

(30) Foreign Application Priority Data
Jan. 11, 2021   (EP) .................................... 21150995

(51) Int. Cl.
*B65G 47/90*   (2006.01)
*B25J 9/00*    (2006.01)
*B65G 61/00*   (2006.01)

(52) U.S. Cl.
CPC ............ *B65G 47/90* (2013.01); *B25J 9/0093* (2013.01); *B65G 61/00* (2013.01)

(58) Field of Classification Search
CPC ...... B65G 61/00; B65G 47/90; B65G 1/1375; B25J 9/0096; B25J 9/0093; B23Q 7/02; B23Q 1/66
See application file for complete search history.

(56) References Cited

U.S. PATENT DOCUMENTS 3,836,018 A * 9/1974 Dawson .................. B65G 57/04
                                          414/792.9
4,291,797 A * 9/1981 Ewertowski ........... B23Q 41/02
                                          198/465.1

(Continued)

FOREIGN PATENT DOCUMENTS

DE     10119679 A1 * 10/2002  ........... B65G 1/1376
DE     10119679 B4    6/2005

(Continued)

OTHER PUBLICATIONS

Canadian Office Action from corresponding Canadian Application No. 3,196,093, dated Aug. 22, 2023, 7 pages.

(Continued)

*Primary Examiner* — Gregory W Adams
(74) *Attorney, Agent, or Firm* — Tucker Ellis LLP

(57) ABSTRACT

The present disclosure relates to a pallet transfer device (1), and a robot palletizing system comprising the pallet transfer device (1) and a robot (2) performing work on pallets, such as loading and unloading articles to and from the pallets. The pallet transfer device (1) comprises a central body (3) arranged for supporting the robot (2), and a platform 4 for moving the pallets in a circumferential direction around the central body (3). The platform comprises a conveyor (5) for loading and unloading the pallets to and from the platform (4).

12 Claims, 9 Drawing Sheets

(56) References Cited

U.S. PATENT DOCUMENTS

| | | | | |
|---|---|---|---|---|
| 4,527,936 | A | * | 7/1985 | Hartlieb ................ B21D 43/20 |
| | | | | 414/744.2 |
| 5,281,081 | A | | 1/1994 | Kato |
| 6,691,748 | B1 | * | 2/2004 | Tajima ................ G01N 35/0099 |
| | | | | 422/562 |
| 7,900,578 | B2 | * | 3/2011 | Hirose ................ B05B 13/0242 |
| | | | | 414/744.2 |
| 9,126,330 | B2 | * | 9/2015 | Yoshino ............. B05B 13/0431 |
| 10,279,468 | B2 | * | 5/2019 | Kobori ...................... B25J 9/06 |
| 10,611,027 | B2 | * | 4/2020 | Kobori ................ G05B 19/402 |
| 11,267,661 | B2 | * | 3/2022 | Boudreau ............ B65B 11/045 |
| 2009/0255632 | A1 | | 10/2009 | Park |
| 2015/0291133 | A1 | | 10/2015 | Hidalgo |
| 2019/0382220 | A1 | * | 12/2019 | Boudreau ............ B65B 11/045 |

FOREIGN PATENT DOCUMENTS

| | | | | |
|---|---|---|---|---|
| JP | 2010201593 | A | * 9/2010 | ........... B65G 1/1376 |
| JP | 2010201593 | A | 9/2010 | |
| WO | 2006065147 | A1 | 6/2006 | |
| WO | 2020209333 | A1 | 10/2020 | |

OTHER PUBLICATIONS

Canadian Office Action from corresponding Canadian Application No. 3,196,093, dated Jun. 9, 2023, 7 pages.

International Search Report and Written Opinion from corresponding International Application No. PCT/EP2021/077730, mailed on Jan. 5, 2022, 15 pages.

* cited by examiner

PALLET TRANSFER DEVICE FOR ROBOT PALLETIZING, A SYSTEM FOR ROBOT PALLETIZING INCLUDING THE PALLET TRANSFER DEVICE AND A METHOD FOR ROBOT PALLETIZING

TECHNICAL FIELD

The present invention relates to a pallet transfer device for robot palletizing. The invention also relates to a system for robot palletizing including the pallet transfer device and the use thereof. The invention further relates to a use of the system for robot palletizing and to a method for robot palletizing using the system.

BACKGROUND

With the number of packets being sent today, efficient loading of packages on pallets is highly sought after. Systems for robot palletizing where one robot loads and unloads packages to several pallets disposed around the robot are common.

Pallets are platforms used to move goods. There are different types of pallets, made of different materials and with different sizes. In recent times, standardization of the size of pallets has occurred to a certain extent. For example, there is a widely used standard for European pallets known as the EUR Pallet.

A system for robot palletizing comprises an industrial robot for loading and unloading articles on pallets arranged in the close vicinity of the robot. The system further comprises one or more transfer devices for supplying empty pallets to the robot, and for moving away the pallet when the robot has filled them with articles. Normally, in a palletizing system using an industrial robot, pallets are moved within the reach of the robot on fixed conveyors. When the robot has finished loading or unloading of the pallets, the pallets are retrieved from the fixed conveyors from the opposite side of the fixed conveyor with respect to the robot. Naturally, this takes a lot of space since there must be room around the palletizing system either for forklifts or other arrangements for retrieving the pallets.

In order to increase the palletizing efficiency, a large number of pallets can be arranged in fixed positions around the robot. There are solutions where the number of pallets arranged close to the robot has been maximized for space and time efficiency. For example, in WO2006065147A1, conveyors with pallet positions are arranged in a circle around the robot. A takeaway ring is arranged around the circle. The takeaway ring comprises carriages that are radially as well as broadwise moveable relative to the circle. Outside the supply and take away ring, an outer circle may be set up, comprising a pallet storage for empty pallets, buffer positions and one or more conveyor band(s) for taking away fully loaded pallets. A problem with such palletizing system is that it requires large space.

In DE10119679B4, a circular conveyor is arranged around the robot on an annular disk. Pallets are lifted to and from the disk with a transfer device with a lifting fork and transferred to an adjacent discharge conveyor.

U.S. Pat. No. 6,691,748B1 discloses a container transfer and processing system. The system comprises a robot and a turntable having a surface for supporting a large number of containers. The turntable surrounds the robot and is arranged rotatable around the robot. The system further comprises a plurality of container working devices disposed around the turntable on the outside of the turntable. The turntable is rotatable around the robot between the container working devices. The container working devices perform various types of operations on the containers and their content. The turntable simultaneously moves the containers between the container working devices. The robot moves the containers between the turntable and the container working devices. The system disclosed is particularly related to container transfer and processing system for loading plate-shaped containers having a specified quantity of storage parts for perform processing for DNA, immunization, chemical reactions, and the like. The container transfer and processing system is not related to handling of pallets in a robot palletizing system.

As demands for increased efficiency and minimized space consumption continues to rise, there is always a need for improved palletizing systems. Minimized costs are, of course, also always desirable.

SUMMARY

It is an aim of the present invention to provide an improved pallet transfer device for use in a robot palletizing system. According to one aspect, the object of the invention is to reduce the space needed for the robot palletizing system. According to another aspect, the object of the present invention is to reduce the costs for the robot palletizing system.

This aim is achieved by the pallet transfer device as defined in claim 1 and the robot palletizing system as defined in claim 11.

The pallet transfer device comprises a central body arranged for supporting a robot performing work on pallets, such as loading and unloading articles to and from the pallets, and a movable platform rotatably connected to the central body such that the platform is movable in a circumferential direction around the central body, and the platform comprises a conveyor for loading and unloading pallets to and from the platform.

A conveyor is mechanical handling equipment that linearly moves materials from one location to another. In this disclosure, the conveyor is arranged for linearly moving pallets on the platform during loading and unloading of the pallets to and from the platform. The conveyor is not a lift and does not move the pallets by lifting and placing them.

The platform is designed for supporting one or more pallets. The platform moves the pallets to defined positions around the robot, and the conveyor on the platform can load and unload pallets to and from the platform at the same time as the robot mounted on the central body performs work on pallets arranged around the robot, such as loading and unloading the pallets with articles. Since the robot is not involved in moving the pallets, the robot can focus on loading and unloading the pallets with articles. There is no need for any additional transfer devices, such as a lifting fork or an additional robot, disposed between the movable platform and an ingoing conveyor for transporting empty pallets within the reach of the robot, and between the movable platform and a discharge conveyor for transporting filled pallets away from the robot, as in the prior art. Thus, the pallet transfer device reduces the space needed for transferring the pallets and accordingly reduces the space needed for the robot palletizing system.

The conveyor makes it easy to load pallets onto the platform and to unload the pallets from the platform. For example, the conveyer makes it easy to move the pallet from the platform onto another conveyer disposed around the robot, and from the other conveyor onto the platform. A conveyor is simple and costs less than using a lifting arrangement, such as a robot, for moving the pallets to the other conveyors.

Another advantage with the pallet transfer device is that it is compact and has a simple design with few parts, and few electrical devices, such as drive systems.

The movements of the platform and the movements of the robot can be performed independent of each other. The pallet transfer device can, for example, be used to move empty pallets and filled pallets at the same time as the robot picks articles and loads pallets arranged around the robot with the articles. The pallet transfer device can, for example, be arranged to move empty pallets from an ingoing conveyor to different locations around the robot, to retrieve filled pallets after they have been filled by the robot, and to move the filled pallets to an outgoing conveyor, at the same time as the robot is loading articles on the pallets located around the robot.

Preferably, the central body is designed for supporting the platform as well as the robot. This reduces the number of parts, and also reduces the space needed for the robot palletizing system.

The term "the platform is movable in a circumferential direction around the central body" means that the platform is movable around the circumference of the central body.

According to some aspects, the platform has an inner end rotatably connected to the central body and an outer end facing away from the central body, and the conveyor is arranged for loading and unloading the pallets at the outer end of the platform. The makes it easy to load and unload the pallet to the platform from fixed conveyors arranged around the robot.

According to some aspects, the platform extends in a radial direction from the inner end attached to the central body to the outer end of the platform. Thus, the platform extends in a radial direction from the central body to the outer end of the platform.

According to some aspects, the conveyor is arranged for moving the pallets in a radial direction with respect to the central body during the loading and unloading of the pallets.

Due to the fact that the conveyor is arranged for loading and unloading the pallets at the outer end of the platform and for moving the pallets in a radial direction with respect to the central body during loading and unloading of the pallets, the conveyor can be used for loading and unloading pallets from a plurality of other conveyors arranged in different radial directions around the robot at fixed positions. In the following, the other conveyors arranged around the robot are named second conveyors. The platform can move the pallets to positions around the robot corresponding to positions of the second conveyors. With the disclosed solution, the pallets can be moved around the robot between the second conveyors and the pallet transfer device. By arranging one of the second conveyors as a discharge conveyor, pallets filled with articles can be moved to the discharge conveyor by the platform on the pallet transfer device.

According to some aspects, the conveyor is arranged for linearly moving the pallets in forward and reverse directions on the platform during unloading and loading of the pallets. Suitably, the conveyor is arranged so that it can move the pallets in a forward direction as well as a reverse direction. For example, the conveyor is arranged to move the pallet in a forward direction, i.e., the pallet is moved in a direction towards the outer end of the platform during unloading of the pallets, and the conveyor is arranged to move the pallet in a reverse direction, i.e., in a direction towards the inner end of the platform during loading of the pallets. For example, the pallets are moved in a radial direction with respect to the central body during the loading and unloading of the pallets.

According to some aspects, the central body extends between an upper end and a lower end, and the platform is rotational about a rotational axis concentric with an axis extending through the central body between the upper end and the lower end. This makes the pallet transfer device more compact and reduces the space needed. Suitably, the platform is rotational about a central axis of the central body.

According to some aspects, the upper end of the central body is provided with a fastening member for fastening the robot to the central body. The fastening member for fastening the robot is disposed at the upper end of the central body This makes it possible to attach the robot to the upper end of the central body, which ensures a compact robot palletizing system with a small footprint. Further, this aspect ensures that the platform is rotatable around the robot. Preferably, but not necessary, the rotational axis of the platform is concentric with a rotational axis of the robot. This makes the palletizing system even more compact.

According to some aspects, the platform is rotatable around the central body and the fastening member for fastening the robot is disposed at the upper end of the central body. This means that the fastening member is disposed above the platform seen in a vertical direction. Thus, the robot is mounted on top of the central body and the platform is rotating below the robot. This is advantageous since the risk that the rotational movement of the platform will disturb the rotational movement of the robot is reduced and vice versa. This also eliminates the risk for collisions between the platform and the robot.

According to some aspects, the central body is cylindrical. This facilitates the manufacturing of the pallet transfer device.

According to some aspects, the pallet transfer device comprises a fastening arrangement arranged at the lower end of the central body for fastening the pallet transfer device on an installation surface.

According to some aspects, the platform is substantially rectangular. Preferably, the conveyor is rectangular. Since most pallets are rectangular, a rectangular platform fits the shape of the pallets and the size of the platform can be reduced. Suitably, the load area of the platform is rectangular. Thus, the load area of the platform can be optimally used.

The size of the platform depends on the size of the pallets and the number of pallets to be transferred by the platform.

According to some aspects, the platform is elongated and arranged so that the longitudinal axis extends in a radial direction with respect to the central body. Since most pallets are elongated and transported on conveyors with their longitudinal axis aligned with the longitudinal axis of the conveyors; loading and unloading of the pallets to the platform is facilitated if the platform is also elongated.

According to some aspects, the platform is designed for supporting at most two pallets at a time. Thus, the platform can transport one or two pallets at a time. This reduces the size of the platform, and accordingly the size of the pallet transfer device. For example, the platform can transport one empty pallet and one filled pallet at the same time. In one application, the platform tenders the robot attached to the central body by providing the robot with empty pallets and by moving away filled pallets. There is plenty of room around the robot for housing several pallets. When the robot has filled a pallet, the platform is used for exchanging the filled pallet with an empty pallet. During the exchange of a pallet, the robot can continue loading articles to another of the pallets arranged around the robot. In this type of applications, there is enough time to move one or two pallets at a time, since it takes some time before the robot has filled a pallet with articles.

According to some aspects, the platform is designed for supporting one single pallet at a time. Thus, the platform is designed for transporting the pallets one by one. This further reduces the size of the platform, and accordingly the size of the pallet transfer device.

According to some aspects, a loading area of the platform is at least 1200 mm×400 mm. This allows the platform to transport at least one pallet. For example, the loading area of the platform is at least 1200 mm×800 mm. This allows the platform to transport at least one EUR pallet. With the loading area of the platform is meant the area of the platform which can be uses for transportation of pallets.

According to some aspects, the loading area of the platform is less than 2000 mm×2000 mm. This allows the platform to transport two EUR pallets and keeps the pallet transfer device small and compact.

According to some aspects, the loading area of the platform is larger than or equal to 1000 mm×400 mm and less than or equal to 2000 mm×2000 mm.

According to some aspects, the width of the conveyor is between 2000 mm and 800 mm. This allows the platform to transport two EUR pallets while the pallet transfer device is kept small and compact.

According to some aspects, the length of the conveyor is between 1800 mm and 800 mm. This allows the platform to transport two EUR pallets while the pallet transfer device is kept small and compact.

According to some aspects, the pallet transfer device comprises a first actuator arranged to actuate the rotational motion of the platform around the central body. For example, the first actuator is a servomotor. A servomotor can be operated precisely such that the platform is moved to exact locations around the central body so that the conveyor on the platform is aligned with the fixed conveyors.

According to some aspects, the pallet transfer device comprises a second actuator arranged to drive the radial motion of the conveyor. For example, the second actuator is an electric motor. The conveyor is, for example, driven by a chain drive or a flat belt drive.

Other motors for actuating the rotation and/or for driving the conveyor than electric motors may be used, for example, combustion engines.

In the case when the conveyor is a roller conveyor, the conveyor may be driven by turning one or more of the rollers; for example, the one furthest from the central body.

Due to the first and second actuators, the rotational motion of the platform and the radial motion of the conveyor are independent of each other.

According to some aspects, the pallet transfer device comprises a control unit arranged to control the first actuator so that the platform is moved around the central body and stopped at defined radial positions for loading and unloading the pallets to and from the platform. The control unit is further arranged to control the second actuator so that the conveyor loads and unloads the pallets to and from the platform when the platform has been stopped at the defined radial positions. This is an efficient way of handling pallets in a robot palletizing system. The robot can be released from the handling of pallets, and can focus on performing work on the pallets, such as loading and unloading articles to the pallets.

For example, when the robot has filled a pallet disposed in a first radial position in relation to the robot with articles, the filled pallet is loaded to the platform and the platform transports the filled pallet to an outgoing conveyor disposed in a second radial position in relation to the robot. Then, the platform can be moved to an ingoing conveyor disposed in a third radial position in relation to the robot for receiving an empty pallet. The empty pallet is loaded to the platform and transported by the platform back to the first position.

According to some aspects, the conveyor comprises a transport mechanism arranged to move the pallets in a radial direction with respect to the central body. The central body defines a rotational axis for the platform, and accordingly the conveyor is arranged to move the pallets in a radial direction with respect to the rotational axis for the platform. The robot is arranged on top of the central body, and the transport mechanism is arranged to move the pallets in a radial direction with respect to the robot. Thus, the conveyor can be used to load and unload pallets from second conveyors arranged in different radial directions around the robot. The transport mechanism may, for example, comprise rolls, a belt, or a chain.

According to some aspects, the conveyor is a roller conveyor, belt conveyor, or a chain conveyor. Any conveyor that can be used to load and onload pallets to and from the platform is possible. The type of conveyor can be chosen depending on the type of pallets to be transported, such us the size of the pallets.

According to some aspects, the platform is arranged rotatable at least 180° around the central body, preferably at least 270° around the central body, and most preferably at least 360° around the central body. This makes it possible to arrange many fixed conveyors around the robot.

According to some aspects, the pallet transfer device comprises a bearing being arranged between the platform and the central body such that the platform is rotatable with respect to the central body. A bearing is a robust way to arrange the platform rotatably around the central body. Because of the low friction in the bearing, the platform is also easily turned.

According to some aspects, the pallet transfer device comprises a ring-shaped element surrounding the central body and arranged rotatable around the central body, the platform is attached to the ring-shaped element, and the bearing is arranged between the ring-shaped element and the platform. This design is simple to manufacture and makes the pallet transfer device compact with only a few parts.

According to some aspects, the bearing is a slewing bearing, a ball bearing or a plain bearing. The bearing can be any kind of bearing that can be used to turn the platform around the central body.

According to some aspects, the bearing is a slewing bearing, also referred to as a turntable bearing. Slewing bearings are compact, reliable, and easy to maintain.

According to some aspects, the platform comprises a coupling device arranged at the outer end of the platform for coupling the conveyor to a second conveyor and the coupling device is arranged to engage and disengage with the second conveyor so that the conveyor of the platform can form a joint conveyor with the second conveyor when the outer end of the platform faces the second conveyor. The second conveyor being one of the fixed conveyors arranged around the pallet transfer device. Thus, it is easy to move pallets between the conveyor on the platform and the fixed conveyors arranged around the robot.

According to some aspects, the second actuator is arranged to drive the joint conveyor. The coupling device is arranged so that the second actuator drives the motions of the conveyor on the platform and the motions of the second conveyor, when the conveyor on the platform is coupled to the second conveyor. Thus, the conveyor of the platform and the second conveyors can be driven by the same actuator. There is thus only a need to have one single actuator for moving both conveyors when they are coupled to each other. Preferably, the one single actuator is arranged on the platform. Thus, all fixed conveyors located around the pallet transfer device can be driven with the actuator on the platform. It is advantageous if the actuator for driving the joint conveyor is arranged on the platform of the pallet transfer device since, then, only one single actuator is needed for actuating the conveyor of the pallet transfer device as well as the second conveyors.

The disclosure also provides a system for robot palletizing comprising the pallet transfer device according to the invention, and a robot attached to the upper end of the central body. The robot is attached to the upper end of the central body and is configured to perform work on pallets, such as loading and unloading articles to and from the pallets. The robot palletizing system is configured so that the conveyor can load and unload a pallet to the platform at the same time as the robot performs work on another pallet. The platform can also move the pallets around the robot at the same time as the robot performs work on another pallet. The system has the same advantages as explained above when discussing the pallet transfer device, here in combination with a robot.

The robot palletizing system comprises a control unit arranged to control the rotation of the platform and the conveyor. The control unit may be arranged on the pallet transfer device or on the robot. It may also be arranged externally of them both; for example, on an external server, or cloud-based.

The pallet transfer device may comprise circuitry for receiving one or more control signals from the control unit. The circuitry may be arranged to receive wireless or wired signals.

Alternatively, the signal is merely a signal to the first actuator of the pallet transfer device, instructing it on how to rotate the platform and a signal to the conveyor ordering the conveyor to start or stop the motion of the conveyor.

According to some aspects, the control unit is a robot controller arranged to control the motions of the robot, the motions of the platform, and the motions of the conveyor. It is advantageous to use the robot controller for controlling the robot as well as the pallet transfer device. A typical robot controller includes means for controlling external axis, which makes it possible to control the first and second actuators from the robot controller. Alternatively, the system comprises a separate robot controller for controlling the motions of the robot.

According to some aspects, the robot palletizing system comprises a plurality of second conveyors arranged in different radial positions around the robot, and the control unit configured to control the rotation of the platform so that the platform is movable between each of the second conveyors. The second conveyors are arranged such that the conveyor on the platform can load and unload pallets to and from the platform when an outer end of the platform faces one of the second conveyors. Thus, the transfer of pallets between the pallet transfer device and the second conveyors is facilitated. Each of the second conveyors is arranged so that one end of the second conveyor is in close vicinity to or in physical contact with the outer end of the platform, when the platform has been rotated so that the outer end of the platform faces the second conveyor. The second conveyors are fixedly positioned in different radial directions around the robot, and preferably within the working area of the robot. The number of second conveyors arranged around the pallet transfer device and the robot can vary depending on the size of the platform and the second conveyors; for example, ten or fourteen. The fact that it is possible to arrange so many second conveyors around the pallet transfer device and the robot, makes the system efficient in that the number of pallets that the robot can reach is maximised.

According to some aspects, the robot palletizing system comprises the pallet transfer device comprising the coupling device according to above. The coupling device of the conveyor of the platform is arranged so that the conveyor of the platform can form a joint conveyor with the second conveyors when the outer end of the platform faces the second conveyor. In other words, the conveyor of the platform can form a joint conveyor with each second conveyor individually. This makes it easy to transfer the pallets between the platform and the second conveyors.

The robot palletizing system comprises an actuator for driving the joint conveyor. The actuator can be arranged on the platform or in connection to each of the at least two second conveyors. The second actuator may thus either be arranged on the platform or in connection with each of the second conveyors.

According to some aspects, the conveyor of the platform and the at least two second conveyors are roller conveyors, belt conveyors, or chain conveyors. It is not necessary that the conveyor of the platform and the second conveyors are of the same kind. A pallet is to be loaded or unloaded to or from the platform, from or to the second conveyors and that may be done even if the conveyor types are different as long as they can hold a pallet. In the case where the conveyors can form joint conveyors as explained above, it is preferable that the conveyors are of the same type.

According to some aspects, the robot is mounted on top of the central body and the platform is rotating below the robot. For example, a base of the robot is attached to the fastening member of the transfer device. Thus, the robot is disposed above the platform seen in a vertical direction. This eliminates the risk for collisions between the platform and the robot.

According to some aspects, the rotational axis of the platform extends through the robot base. For example, the rotational axis of the platform coincides with a first rotational axis of the robot.

According to some aspects, the robot palletizing system comprises a height adjustment part arranged between the pallet transfer device and the palletizing robot. The height adjustment part may be a static part or have an adjustable height. It may comprise a pedestal that can be fastened between the pallet transfer device and the robot. If the height adjustment part has adjustable height, it may be a telescopic arrangement that can be set to different heights. The height adjustment part is for arranging the robot at a desirable height. Different types of robots may require different working heights. Different palletizing stations may also require different working heights. The height adjustment part makes the system more flexible in terms of where it can be used and with what robots.

According to some aspects, the robot palletizing system comprises a pallet wrapping machine, wherein at least one of the at least two second conveyors is partly arranged under the pallet wrapping machine. A pallet that has been loaded with packages by the robot on one of the second conveyors may then be moved by the pallet transfer device to the second conveyor comprising the pallet wrapping machine for wrapping the pallet with the packages. The second conveyor being partly arranged under the pallet wrapping machine may be where the packaged pallets are retrieved from the palletizing station including the palletizing system.

According to another aspect, the invention relates to a method for robot palletizing using the system according to the invention.

The method comprises:
disposing a plurality of pallets around the robot,
controlling the robot so that the robot is loading and unloading articles to and from the pallets,
moving the movable platform in a circumferential direction around the robot to one of the pallets,
controlling the conveyor on the movable platform so that the pallet is loaded to the movable platform,
moving the movable platform with the pallet in a circumferential direction around the robot to a determined position, and
controlling the conveyor on the movable platform so that the pallet is unloaded from the movable platform when the platform has reached the determined position.

The determined position is, for example, the location of a discharge conveyor.

According to another aspect, the invention relates to the use of the system for robot palletizing. The robot is used for loading and unloading articles to and from the pallets, the conveyor on the movable platform is used for loading and unloading the pallets to and from the movable platform, and the movable platform is used for moving the pallets in a circumferential direction around the robot.

BRIEF DESCRIPTION OF THE DRAWINGS

The invention will now be explained more closely by the description of different aspects and with reference to the appended figures.

DETAILED DESCRIPTION

Figure 1:
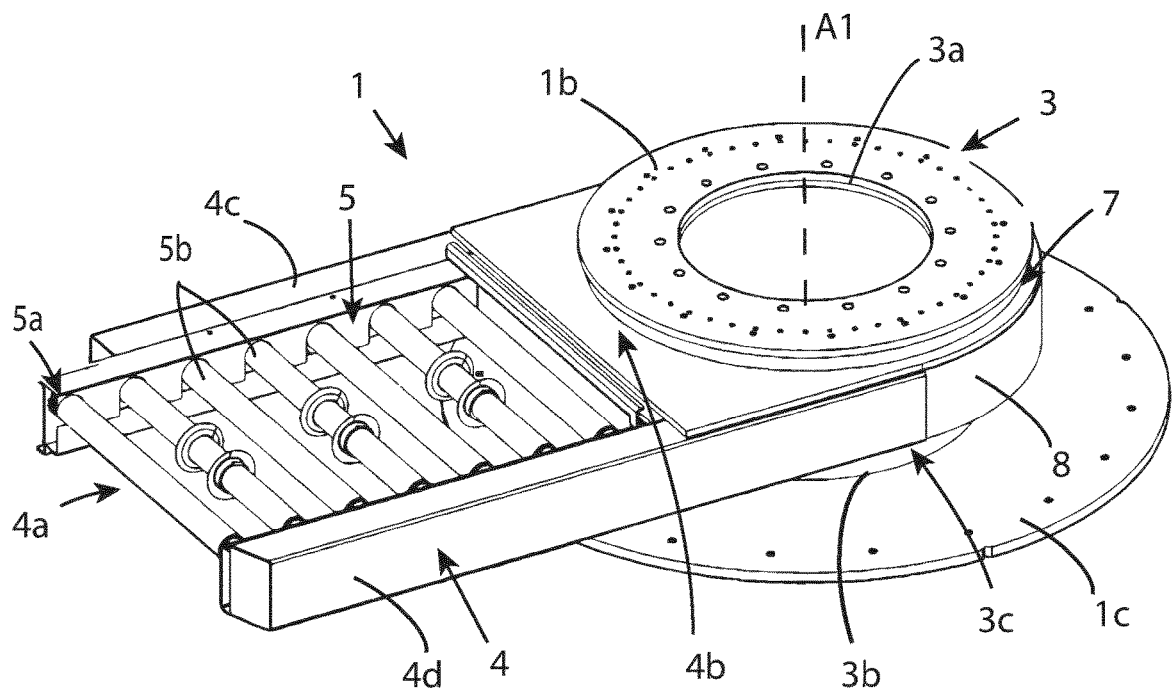
FIG. 1 shows an example pallet transfer device in a perspective view.

Aspects of the present disclosure will be described more fully hereinafter with reference to the accompanying drawings. The device and system disclosed herein can, however, be realized in many different forms and should not be construed as being limited to the aspects set forth herein. Like numbers in the drawings refer to like elements throughout.

The terminology used herein is for the purpose of describing particular aspects of the disclosure only and is not intended to limit the disclosure. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this disclosure belongs.

FIG. 1 shows an example pallet transfer device 1 for robots in a perspective view. The pallet transfer device 1 comprises a central body 3 for supporting the robot. The central body 3 comprises an upper end 3a, and a lower end 3b. The central body 3 extends between the upper end 3a and the lower end 3b along an axis. The central body 3 is provided with a fastening member 1b for fastening the robot to the central body 3. The fastening member 1b may be arranged in connection with the upper end 3a, for attaching a robot to the upper end 3a of the central body 3 of the pallet transfer device 1. In this example, the fastening member 1b is a fastening plate provided with a plurality of through holes. A bottom fastening arrangement 1c may be arranged in connection with the lower end 3b of the central body for fastening the pallet transfer device 1 on an installation surface, such as a floor. The pallet transfer device 1 is to be used together with a robot in a palletizing system.

The central body 3 has, for example, the shape of a cylinder, i.e., a right circular cylinder. However, the central body can have other shapes. The central body 3 has an envelope surface 3c between the upper and lower ends 3a, 3b.

The pallet transfer device 1 comprises a platform 4 rotatably arranged on the central body 3 such that the platform 4 is rotatable around the central body. Accordingly, the platform is rotatable around the envelope surface 3c. The platform is rotatably connected to the central body so that the platform moves the pallets (6) in a circumferential direction around the central body (3). The platform 4 is arranged rotatable about a rotational axis A1. Suitably, the rotational axis A1 coincides with the axis of the central body. In case the central body 3 has the shape of a cylinder, the rotational axis A1 preferably coincides with the axial direction of the cylinder. The platform is arranged rotatable at least 180° around the central body, preferably at least 270° around the central body, and most preferably at least 360° around the central body. Suitably, the platform 4 has an inner end 4b rotatably connected to the central body 3 and an outer end 4a facing away from the central body 3. Preferably, the platform extends in a radial direction with respect to the central body from the inner end 4b to the outer end 4a. The platform 4 can be elongated in the radial direction. Preferably, the platform 4 is designed for transporting at most two pallets at a time. This is advantageous since it makes the pallet transfer device small and compact, and thus reduces the space needed for the robot palletizing system. In this example, the platform 4 is designed for transporting one single pallet at a time.

The platform 4 comprises a conveyor 5 for loading and unloading the pallets to and from the platform. The conveyor 5 is arranged to load and unload pallets at the outer end 4a of the platform 4. Suitably, the conveyor 5 is arranged for linearly moving the pallets along the platform during the loading and unloading of the pallets. In this example, the platform 4 comprises two arms 4c-d arranged in parallel and at a distance from each other, and the conveyor 5 is arranged between the arms 4c-d. The conveyor 5 is attached to the arms 4c-d. The conveyor is arranged to support the pallets. Thus, the size of the conveyor 5 defines the loading area of the platform 4. Preferably, the shape of the conveyor is rectangular since most standard pallets are rectangular. Preferably, the size of the loading area of the platform 4 is less than 2000 mm×2000 mm to keep the pallet transfer device small and compact. Preferably, the size of the loading area of platform is at least 1000 mm×400 mm to allow the platform to transport a pallet.

The standardized size dimension of a EUR pallet is 1200 mm×800 mm. For example, the size of the loading area of platform is at least 1200 mm×800 mm to be able to transport a EUR pallet. Suitably, the width of the conveyor 5 is between 2000 mm and 800 mm. Suitably, the length of the conveyor 5 is between 1800 mm and 800 mm. This allows the platform to transport one or two EUR pallets while the pallet transfer device is kept small and compact. However, there exists many other types of pallets with other dimensions. Thus, the platform can have other sizes depending on the type of pallets to be transported.

The conveyor 5 comprises a transport mechanism 5a arranged to move the pallets in a radial direction with respect the axis of the central body during loading and unloading of the pallets to and from the platform. Suitably, the transport mechanism 5a is arranged to move the conveyor in a forward direction as well as a backward direction with respect to the central body depending on whether the pallet is to be loaded to the platform or unloaded from the platform. For example, the transport mechanism 5a is arranged to move the conveyor in a forward direction towards the outer end 4a of the platform during unloading of the pallets, and the transport mechanism 5a is arranged to move the conveyor in a reverse direction towards the inner end 4b of the platform during loading of the pallets. In this example, the transport mechanism 5a comprises a plurality of spaced apart rolls 5b arranged rotatable about their longitudinal axis, and a chain connected to the rolls 5b so that all the rolls are rotated synchronously when one of the rolls is rotated. The rolls can be rotated clockwise a well as counterclockwise. The transport mechanism 5a can be arranged in different ways. For example, the transport mechanism 5a may include a transport belt.

The lower end 3b of the central body 3 may comprise a fastening arrangement 1c, for example, in the form of a circular plate to fasten the pallet transfer device 1 on the installation surface. The circular plate may have a larger diameter than the central body 3 for extra stability when fastened to the installation surface.

The pallet transfer device 1 may comprise a bearing 7 arranged between the platform 4 and the central body 3 such that the platform 4 is rotatable with respect to the central body 3. A bearing 7 is a robust way to arrange the platform 4 rotatable around the central body 3. It should be noted that the bearing is not visible in the figures, but an arrow indicates where it is in FIG. 1.

As can be seen in the example illustrated in FIG. 1, the pallet transfer device 1 may comprise a ring-shaped element 8 surrounding the central body 3 and arranged rotatable around the central body 3. The platform 4 is attached to the ring-shaped element 8, and the bearing 7 is arranged between the ring-shaped element 8 and the platform 4. In the illustrated example, the arms 5c-d of the platform are attached to the ring-shaped element 8. Because of the low friction in the bearing 7, the platform 4 is also easily turned. The platform 4 is thus turned by rotating the bearing 7. The bearing 7 is, for example, a clewing bearing, a ball bearing or a plain bearing. Slewing bearings, also named turntable bearings, are compact, reliable, and easy to maintain. The bearing 7 can be any kind of bearing that can be used to turn the platform 4 around the central body 3.

It should be noted that the platform 4 may be telescopically arranged on the central body 3 of the pallet transfer device such that it can be moved linearly away from and towards the central body 3.

Figure 2:
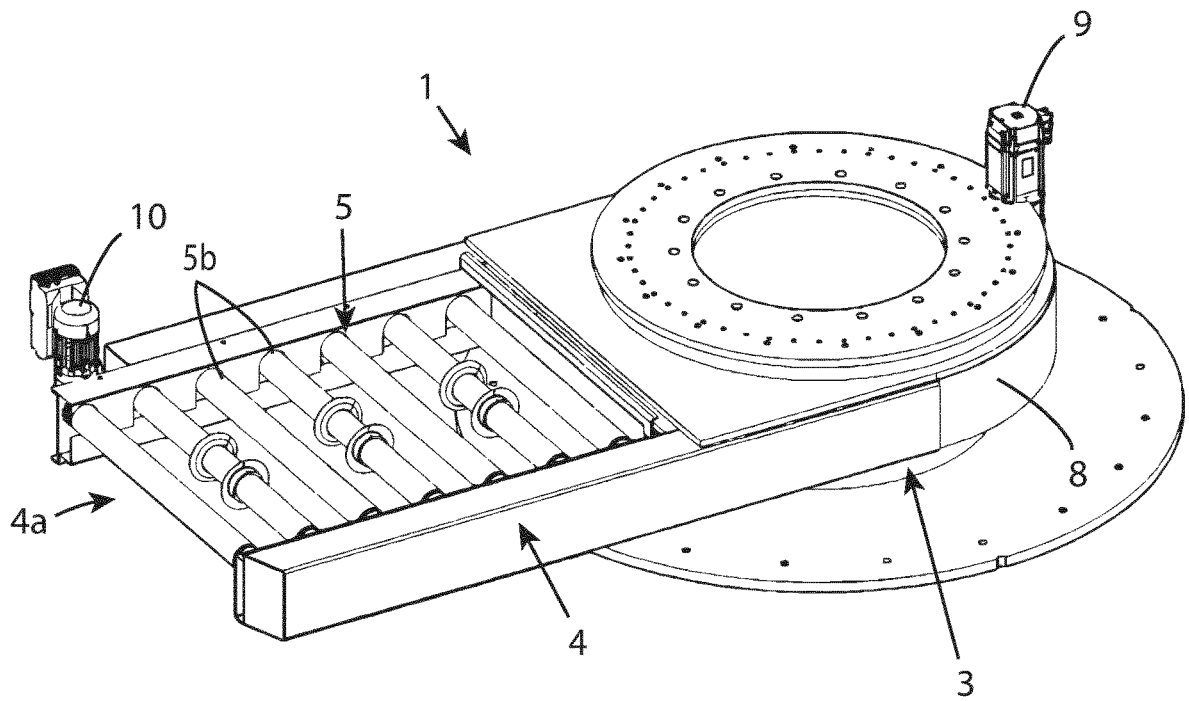
FIG. 2 shows an example pallet transfer device with two actuators in a perspective view.
Figure 3:
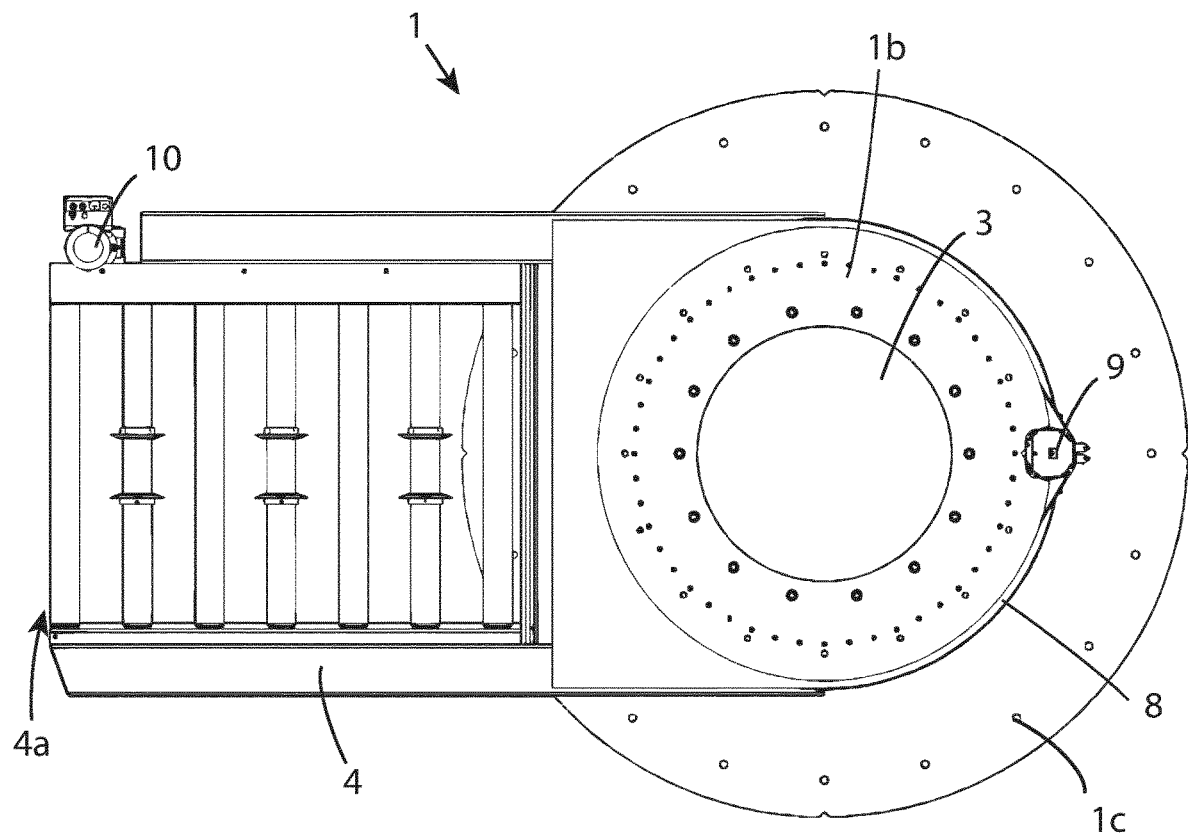
FIG. 3 shows the example pallet transfer device of FIG. 2 from above.
Figure 4:
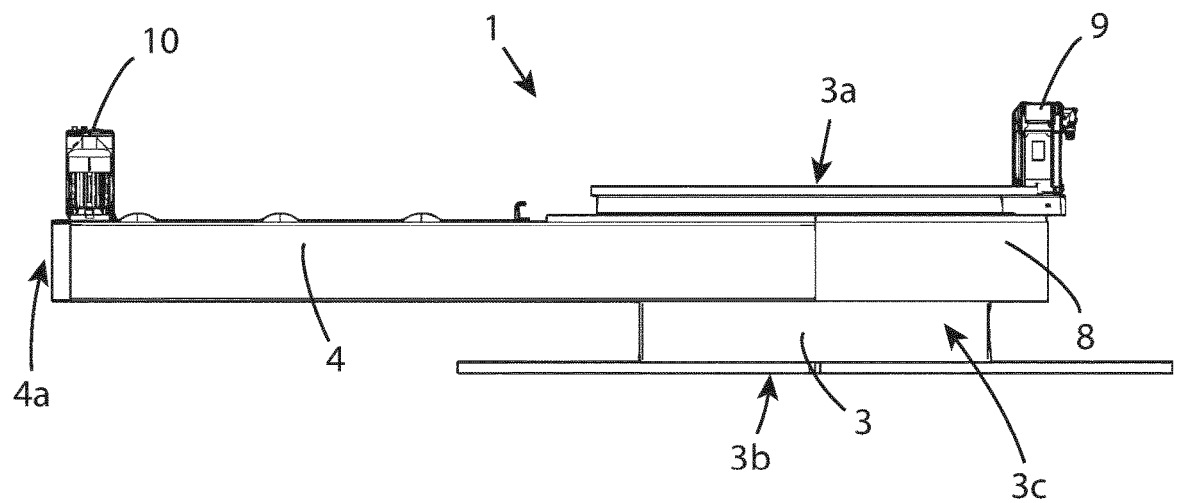
FIG. 4 shows the example pallet transfer device of FIG. 2 from the side.

FIG. 2 shows an example pallet transfer device 1 with two actuator 9, 10 in a perspective view. FIG. 3 shows the example pallet transfer device 1 of FIG. 2 from above and FIG. 4 shows the example pallet transfer device 1 of FIG. 2 from the side. The pallet transfer device 1 comprises a first actuator 9 arranged to actuate rotational motion of the platform 4. The first actuator 9 is arranged to actuate rotational motion of the platform 4 both in forward and reverse circumferential directions around the central body. For example, the first actuator 9 is a servomotor. A servomotor can be operated precisely such that the platform 4 is moved to exact locations around the central body 3 so that the conveyor 5 on the platform 4 is aligned with the fixed conveyors. The pallet transfer device 1 further comprises a second actuator 10 arranged to drive the motions of the transport mechanism 5a of the conveyor 5. For example, the second actuator 10 is an electric motor. Other actuators for actuating the rotation and/or for driving the conveyor than electric motors may be used, for example combustion engines. The conveyor 5 can, for example, be driven with a chain drive or a flat belt drive.

The first actuator 9 actuating the rotational movement of the platform 4 is, for example, a servomotor which turns the bearing 7 by rotating a gear that engages a rack on the bearing 7. An advantage with using a servomotor is that it allows for precise control of position, velocity, and acceleration. Another option is to use a stepper motor for this. The first actuator 9 may comprise a sensor for determining the position of the platform 4. The sensor is, for example, a resolver or an encoder. Alternatively, the sensor is positioned directly on the platform. The output from the sensor can be used for controlling the position of the platform. The control unit 12 can then use input from the sensor to determine how to move the platform 4 and accordingly how to control the actuator 9.

The second actuator 10 for driving the conveyor 5 is, for example, a three-phase motor. Other motors for actuating the rotation and/or for driving the conveyor 5 than electric motors may be used. The second actuator 10 for driving the conveyor 5 may also be a servomotor and the actuator 9 actuating the rotational movement of the platform 4 may also be a three-phase motor.

An alternative for turning the platform 4 is, for example, to arrange wheels on the platform 4 which engages the installation surface under the pallet transfer device 1 and where at least one of the wheels is driven by a motor.

An alternative to using electric motors is to use pneumatic motors.

In the case when the conveyor is a roller conveyor, the conveyor may be driven by turning one or more of the rollers; for example, the one furthest from the central body 3. When turning all rollers, they are, for example, turned by a chain turning all the rollers in a synchronized manner. The chain is, for example, driven by a gear driven by a motor.

Another word for roller conveyor is line-shaft roller conveyor.

The protruding rings that are illustrated on three of the rollers are for guiding pallets so that the pallets are loaded and unloaded straight on conveyor 5 of the platform 4. The protruding rings are optional.

Figure 7:
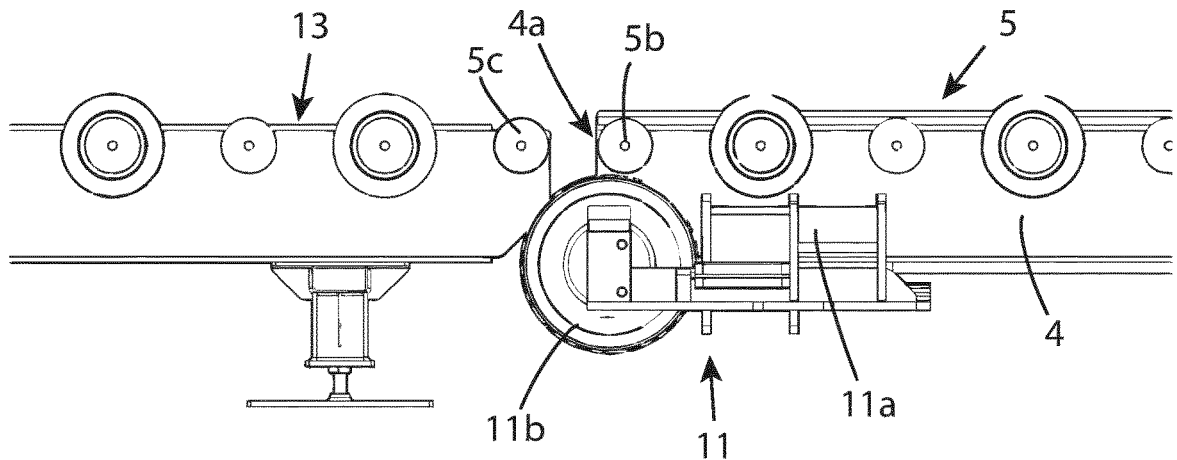
FIG. 7 shows an example coupling device which has been mounted to a platform.

The platform 4 may comprise a coupling device 11 at the outer end 4a of the platform 4 for coupling the conveyor 5 to a second conveyor 13, as shown in FIG. 7. The second conveyor 13 then becomes one of several fixed conveyors 13 arranged around the pallet transfer device 1. The second conveyors 13 are illustrated in FIGS. 9, and 12-17. With the coupling device 11, the conveyor 5 of the platform 4 and the second conveyor 13 can be driven by the same drive, for example, the second actuator 10. There is thus only a need to drive one of them and if the actuator is arranged on the platform 4, all fixed conveyors around the pallet transfer device 1 can be driven with the second actuator of the platform 4 with the coupling device 11.

Figure 5:
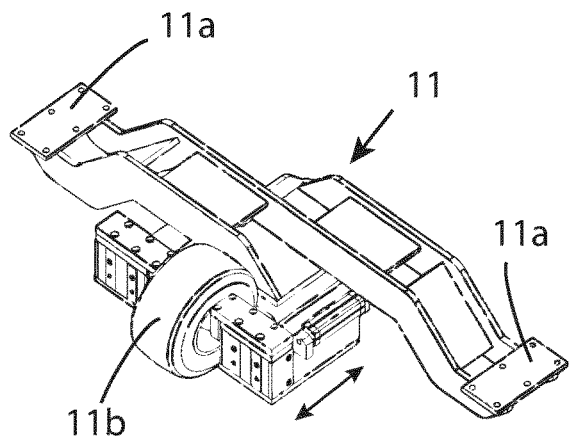
FIG. 5 shows an example coupling device for coupling the conveyor to a second conveyor.

FIG. 5 shows an example coupling device 11 coupling the conveyor 5 to a second conveyor 13. This example device can be used when the conveyors are roller conveyors. The example coupling device 11 comprises a fastening device 11a for fastening the coupling device 11 to the platform 4 and a wheel 11b which is to be positioned so that it abuts both a roller 5b of the conveyor 5 and a roller 5c of the second conveyor 13. Thus, when the roller 5b of the platform 4 is rolled, so is the roller 5c of the second conveyor, driven by the wheel 11b which, in turn, is driven by the roller 5b of the platform 4.

Figure 6:
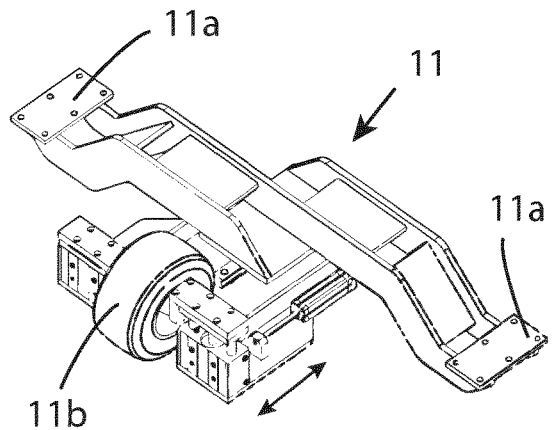
FIG. 6 shows the example coupling device of FIG. 5 where the wheel has been moved.

FIG. 6 shows the example coupling device 11 of FIG. 5 where the wheel 11b has been moved. The example coupling device 11 can be arranged to be moveable between at least two positions by a linear motion. The linear motion is, for example, driven by an electric motor.

Figure 8:
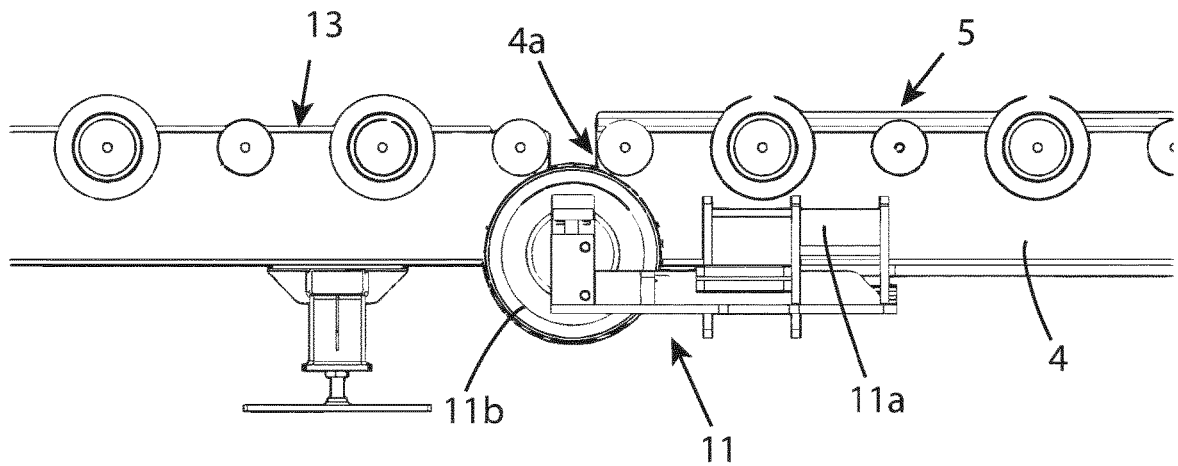
FIG. 8 shows the example coupling device of FIG. 7 where the wheel has been moved to push it towards a conveyor it is to engage.
Figure 9:
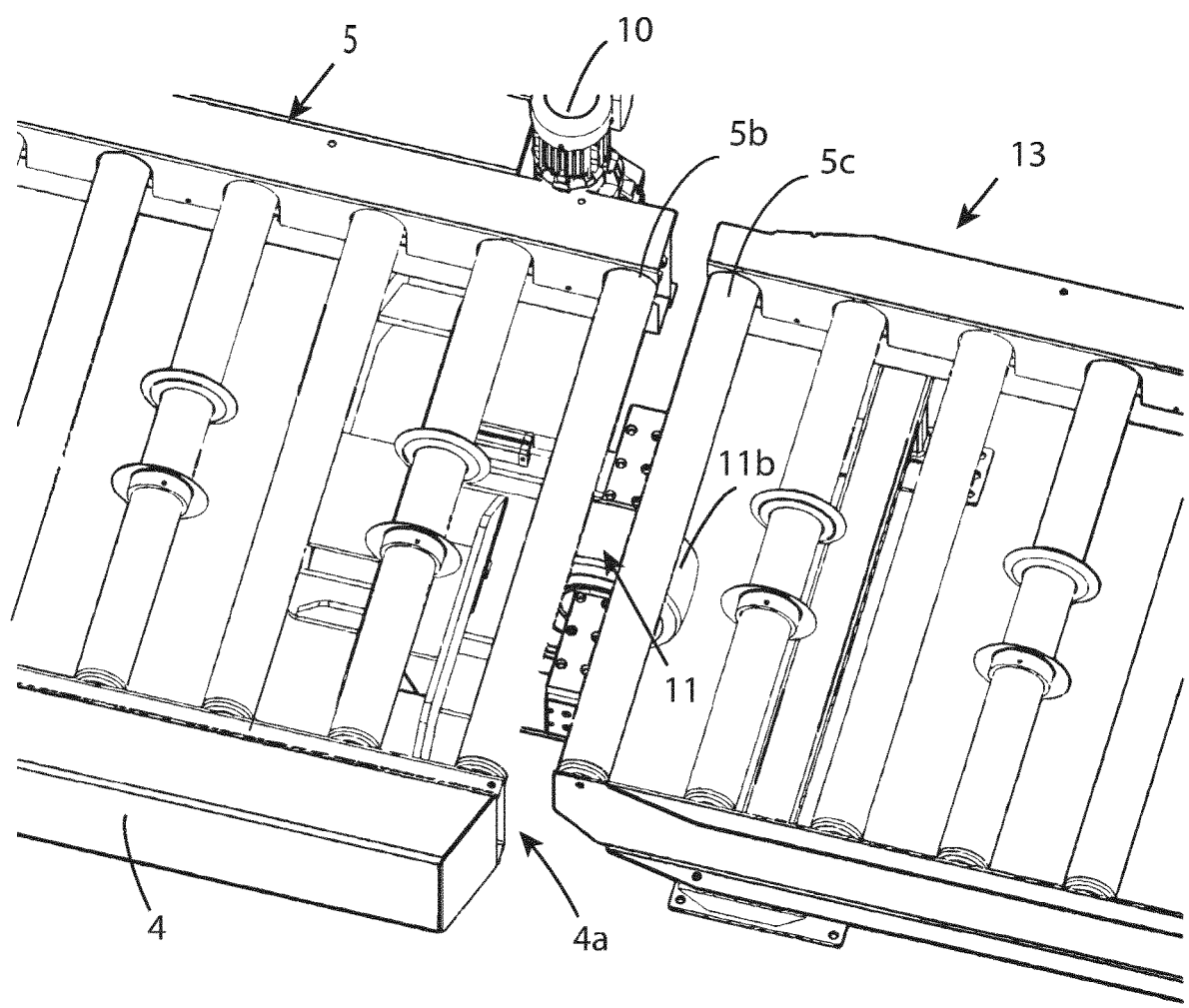
FIG. 9 shows the example coupling device of FIG. 8 in a perspective view.

FIG. 7 shows an example coupling device 11 which has been mounted to a platform 4 and FIG. 8 shows the example coupling device 11 of FIG. 7 where the wheel 11b has been moved to push it towards a conveyor it is to engage. It should be noted that FIGS. 7 and 8 show a view from the side but the lines of the coupling device are shown over the lines of the platform and the conveyors to better show the coupling device. As can be seen in the figure, the wheel 11b is moved to a position where the wheel 11b abuts a roller 5b of the conveyor and a roller 5c of the second conveyor 13. FIG. 9 shows the example coupling device 11 mounted on a platform 4 in a perspective view. In these figures, it can be seen that the fastening device is fastened to the platform 4 on the underside of the platform 4.

An alternative coupling device 11 is, for example, in the case the conveyor 5 is driven by a chain, to use a gear at the outer end 4a of the platform, which is arranged to engage both the chain of the platform 4 conveyor 5 and a chain of the second conveyor. In such a case, the chain of the platform 4 conveyor 5 drives the gear which, in turn, drives the chain of the second conveyor. In this example, it may be beneficial if the platform 4 is telescopically arranged on the central body 3 as explained above to facilitate the engagement of the gear in the chain of the second conveyor.

Figure 10:
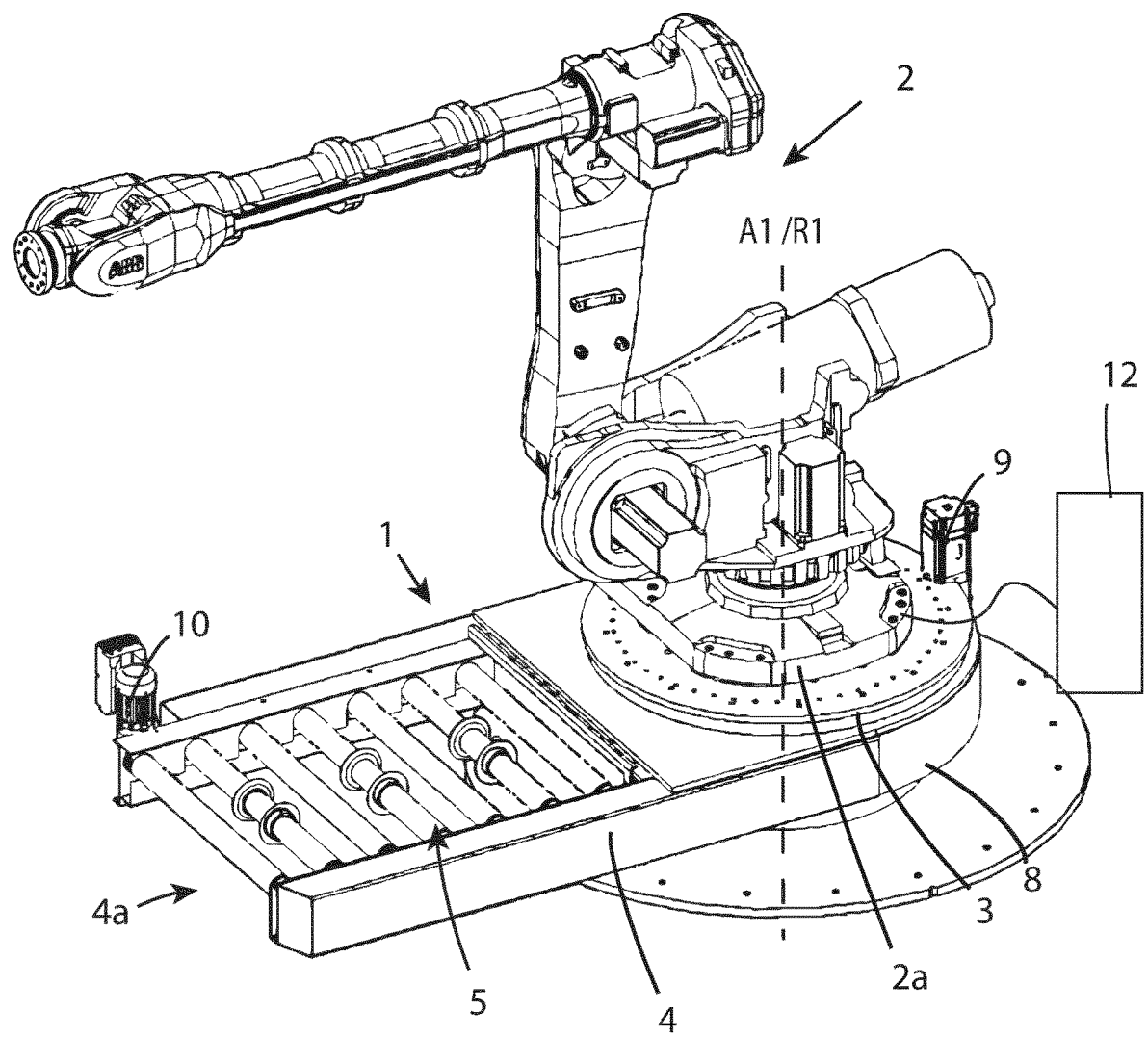
FIG. 10 shows an example robot palletizing system with a pallet transfer device and a robot.

FIG. 10 shows an example of a robot palletizing system comprising a pallet transfer device 1, and a robot 2 arranged on the upper end of the central body 3. As seen in the figure, the robot is disposed above the platform 4 in a vertical direction. The robot is mounted on top of the central body and the platform is rotating below the robot.

The platform 4 is rotatable around the robot 2. Preferably, the platform 4 is rotatable at least 180° around the robot 2, more preferably at least 270° around the robot 2, and most preferably at least 360° around the robot. The robot palletizing system comprises a control unit 12 arranged to control the rotation of the platform 4 around the central body. The control unit 12 is arranged to control the first actuator 9 so that the platform 4 is moved around the central body 3 and stopped at defined radial positions. The control unit 12 can also be arranged to control the second actuator 10 so that the conveyor 5 loads and unloads the pallets to and from the platform 4 when the platform has been stopped at the defined radial positions. The control unit 12 can be a part of the pallet transfer device 1, or a part of the robot palletizing system. The control unit 12 can also be a part of a robot controller for controlling the motions of the robot.

Figure 12:
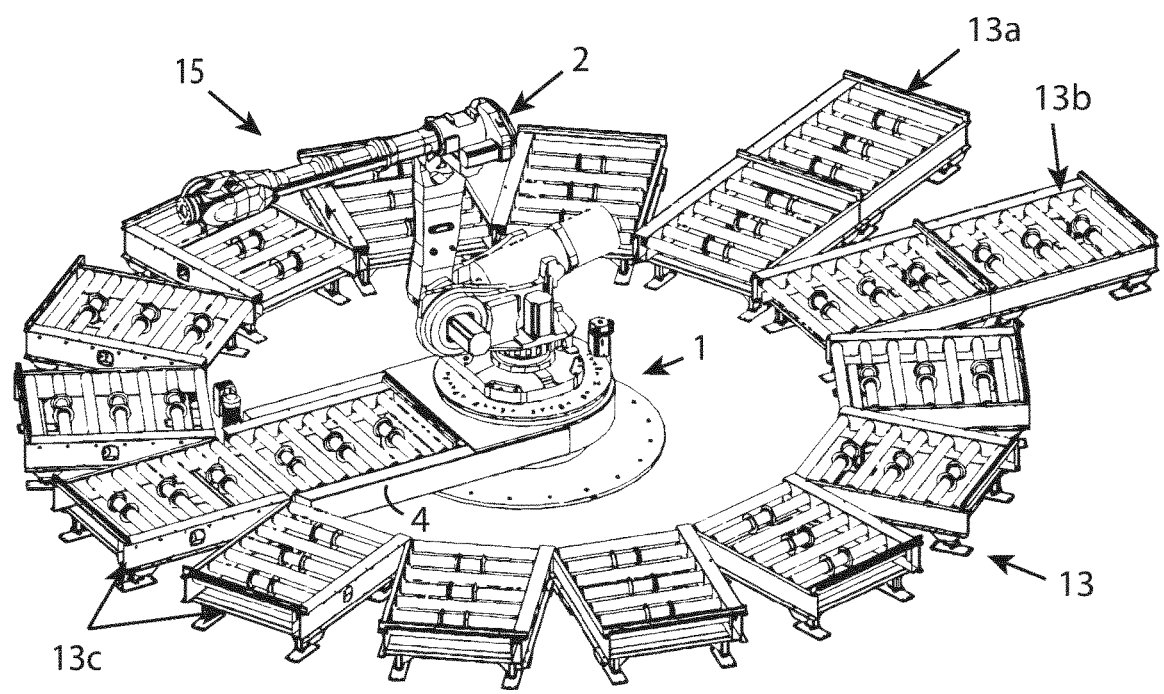
FIG. 12 shows an example robot palletizing system with a pallet transfer device, a robot and second conveyors arranged around the pallet transfer device and the robot.

The control unit 9 is configured to control the platform 4 in accordance with one or more control programs including program instructions for how to control the motions of the pallet transfer device, e.g., rotate the platform to a certain position, stop the rotation until the pallet has been loaded on the platform, or the pallet has been unloaded from the platform, and rotate the platform to a new position. The control unit 12 can be provided with stored positions, which indicate where to move the platform 4, for example, positions where the platform is aligned with fixed second conveyors 13 arranged around the transfer device 1, as shown in FIG. 12. The control program can, for example, comprise instructions on how to move the platform 4 to positions where it is aligned with the fixed conveyors 13. The control unit 12 can be configured to control the first actuator 9 based on the one or more control programs. The control unit 12 is, for example, configured to generate one or more control signals to the first actuator 9 based on the control program.

The control unit 12 can also be arranged to control the motions of the conveyor 5, e.g., to start and stop the conveyor, and the direction of the motion of the conveyor. The control unit 12 can be arranged to control the first actuator 9 and the second actuator 10.

The control unit 12 comprises processing circuitry for processing data and control programs. The control unit 12 either comprises communication circuitry or is connected to communication circuitry for receiving sensor data and sending instructions for the components it is controlling. Communication between the control unit 12 and the first and second actuators 9, 10 can be made wired or wireless.

In this example, the robot 2 has six axes. However, the robot can have more or less than six axes. It should be noted that the robot 2 illustrated in the figures is just an example robot. It does not matter which type of robot is used on the pallet transfer device 1. There are many robots capable of palletizing. Furthermore, the pallet transfer device 1 is easily adapted to be able to support any type of robot 2.

In this example, the robot 2 has three main axes and three wrist axes. A stationary foot, usually referred to as the base 2a of the robot, supports a stand which is rotatable about a first axis R1. The base 2a of the robot is attached to the fastening member 1b on the central body 3 of the transfer device 1. The rotational axis A1 of the platform extends through the robot base 2a. In the illustrated example, the rotational axis A1 of the platform coincides with the first rotational axis R1 of the robot 2.

The stand supports a first arm which is rotatable about a second axis. The first arm supports a second arm which is rotatable about a third axis. The second arm supports a wrist which is rotatable about a fourth, a fifth and a sixth axis. The wrist supports a tool. The movements of the robot 2 are controlled by a robot controller. For example, the control unit 12 is a robot controller.

Here, the pallet transfer device 1 is a part of a system where a robot 2 is arranged on the control body of the pallet transfer device 1. The control unit 12 may be arranged on the pallet transfer device 1 or on the robot 2. It may also be arranged externally of them both; for example, on an external server or cloud based.

In FIG. 10, the control unit 12 is a robot controller and arranged to control the movements of the robot as well as the rotation of the platform 4 and the motions of the conveyor 5. In this example, the control unit 12 includes software as well as hardware, such as input and output means, a processor unit including one or more central processing units (CPU), for handling main functions of the robot controller such as executing robot programs, performing path planning, providing orders to the drive unit of the robot regarding movements of the robot and generating motor references to the motors of the robot. The control unit 12 also includes software as well as hardware for controlling external axes, i.e., for controlling the first and second actuators 9, 10. Thus, the robot controller is adapted to generating control signals, such as motor references, to the first and second actuators 9, 10 as well as to the motors of the robot.

The control unit 12 comprises program storage for storing robot program for controlling the motions of the robot and control programs for controlling the motions of the pallet transfer device, and a program executor adapted to execute the stored robot programs and control programs for the pallet transfer device.

The pallet transfer device 1 may comprise circuitry for receiving a control signal from the control unit 12. The circuitry may be arranged to receive wireless or wired signals. Alternatively, the signals merely include a signal to the first actuator 9 of the pallet transfer device 1, instructing it on how to turn the platform 4, and a signal to the conveyor to start and stop the conveyor.

The control unit 12 may also be arranged to control the movement of the coupling device 11 in case one is used.

Figure 11:
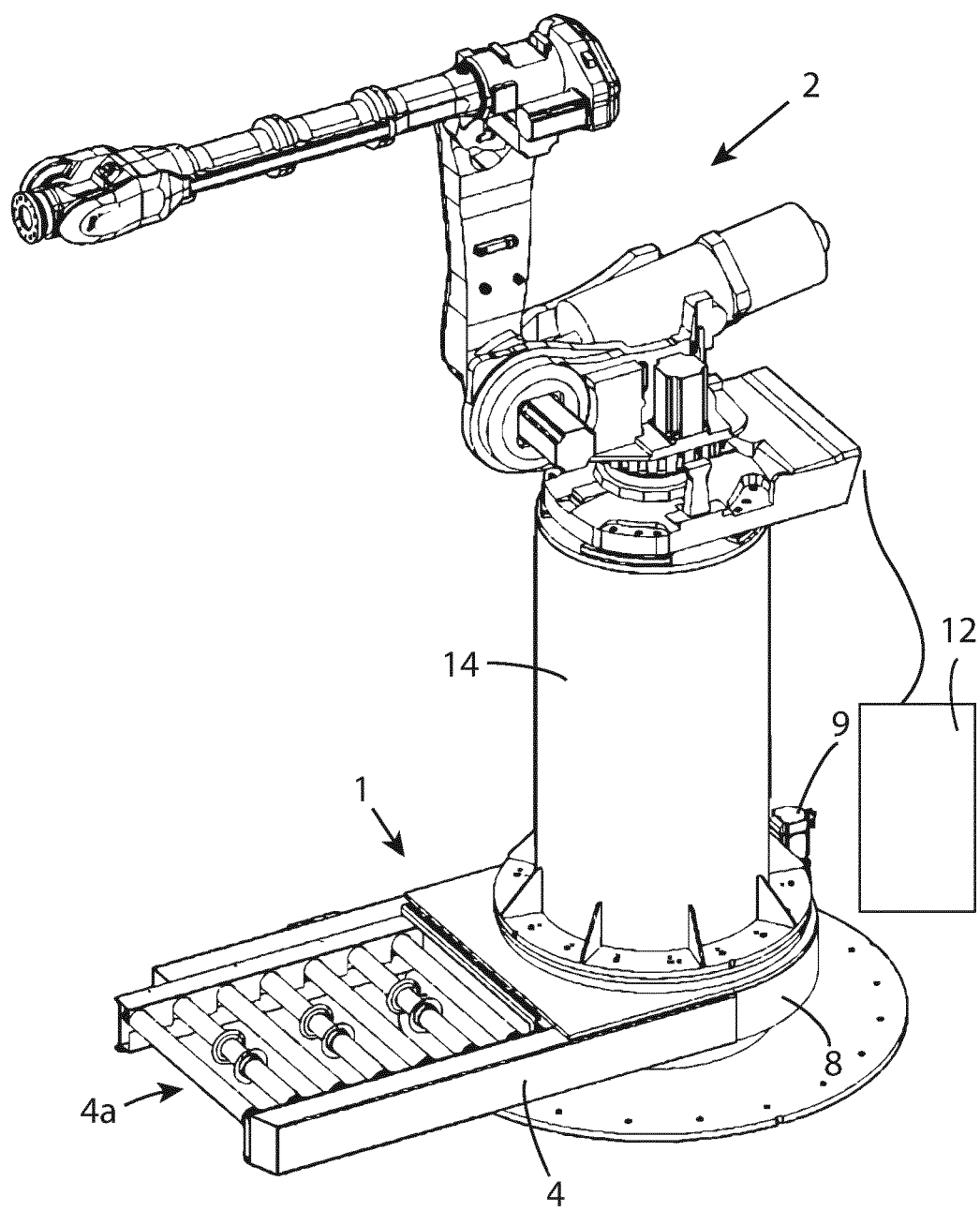
FIG. 11 shows an example robot palletizing system with a pallet transfer device and a robot mounted with a height adjustment part arranged therebetween.

FIG. 11 shows an example robot palletizing system with a pallet transfer device 1 and a robot 2 mounted with a height adjustment part 14 arranged therebetween. The robot palletizing system may comprise a height adjustment part 14 arranged between the pallet transfer device 1 and the palletizing robot 2. The height adjustment part 14 may be a static part or have an adjustable height. It may comprise of a pedestal that can be fastened between the pallet transfer device 1 and the robot 2. If the height adjustment part 14 has adjustable height, it may be a telescopic arrangement that can be set to different heights. The height adjustment part 14 is for arranging the robot 2 at a desirable height. Different types of robots 2 may require different working heights. Different palletizing stations may also require different working heights. The height adjustment part 14 makes the system more flexible in terms of where it can be used and with what robots. The height adjustment part 14 may also be used to adapt the fastening arrangement of the pallet transfer device 1 to a specific robot 2. In other words, the height adjustment part 14 may be designed differently in the top end depending on which robot is to be arranged on it.

FIG. 12 shows an example robot palletizing system 15 with a pallet transfer device 1, a robot 2 and a plurality of second conveyors 13 arranged around the pallet transfer device 1 and the robot 2. The positions of the second conveyors 13 are fixed. The robot palletizing system comprises at least two second conveyors 13 arranged in different radial directions around the robot. Thus, at least two of the second conveyors 13 may be part of the robot palletizing system. Depending on the size of the platform 4 and the second conveyors 13, the number of second conveyors 13 arranged around the pallet transfer device 1 may vary. For example, the number of second conveyors can vary between two and fourteen. Preferably, the robot palletizing system comprises at least three second conveyors 13 arranged in different radial directions around the robot. More preferably, the robot palletizing system comprises at least five second conveyors 13 arranged in different radial directions around the robot. Even more preferably, the robot palletizing system comprises at least ten second conveyors 13 arranged in different radial directions around the robot. The second conveyors 13 may include conveyors of different sizes and types. For example, the second conveyors 13 may include an ingoing conveyor 13a for supplying pallets, such as empty pallets, to the system, and an outgoing conveyor 13b for transportation of finished pallets, such as filled pallets, from the system. For example, the second conveyors 13 may include a plurality of pallet supporting conveyors 13c for supporting the pallets when the robot is loading and unloading the pallets. Suitably, the pallet supporting conveyors 13c have a size substantially corresponding to the size of one pallet 6. The pallet support conveyors 13c can be made smaller than conventional conveyors used in robot palletizing systems, and thus less space is needed.

The control unit 12 is configured to control the rotation of the platform 4 so that the platform 4 is movable between each of the second conveyors 13. The second conveyors 13 are arranged such that they can load and unload pallets to and from the conveyor 5 on the platform 4 when the outer end 4a of the platform 4 faces one of the second conveyors 13. The second conveyors 13 are disposed at a distance from the central body of pallet transfer device 1 so that the platform 4 is allowed to rotate around the robot 2 without colliding with the second conveyors 13, and the robot can perform work on the conveyors without colliding with the platform. The second conveyors 13 should preferably be located within the work area of the robot, so that the robot can reach the conveyors. In the disclosed example, the robot palletizing system comprises fourteen second conveyors 13 arranged around the pallet transfer device 1 and the robot 2. The fact that it is possible to arrange so many second conveyors 13 around the pallet transfer device 1 and the robot 2, makes the system efficient in that the number of conveyors that the robot 2 can reach is maximised.

With the disclosed solution, the platform 4 can be moved around the robot between the second conveyors 13, and pallets can be loaded to and unloaded from to the platform when the outer end of the platform faces the second conveyors. The ingoing conveyor 13a supplies pallets to the system, and the outgoing conveyor 13b works as a discharge conveyor transporting finished pallets from the system. Pallets can be moved from the ingoing conveyor 13a to any of the second conveyors 13c by the platform 4 on the pallet transfer device 1, and pallets can be moved from any of the second conveyors 13c to the outgoing conveyor 13b by the platform 4 on the pallet transfer device 1. At the same time as pallets are transferred between the second conveyors 13a, 13b, 13c by the pallet transfer device 1, the robot 2 can perform work on the pallets on the second conveyors 13c. For example, the robot can fill the pallets on the conveyors 13c with articles. In such case, the robot palletizing system may also comprise one or more second conveyors for supplying articles to the robot.

The transfer of the pallets and the movements of the robot 2 can be performed independent of each other. The conveyor 5 on the pallet transfer device 1 can, for example, be used to transfer empty pallets and filled pallets between the platform 4 and the second conveyors 13 arranged around the robot at the same time as the robot 2 picks articles and fills the pallets positioned on the second conveyors 13c with the articles.

Figure 13:
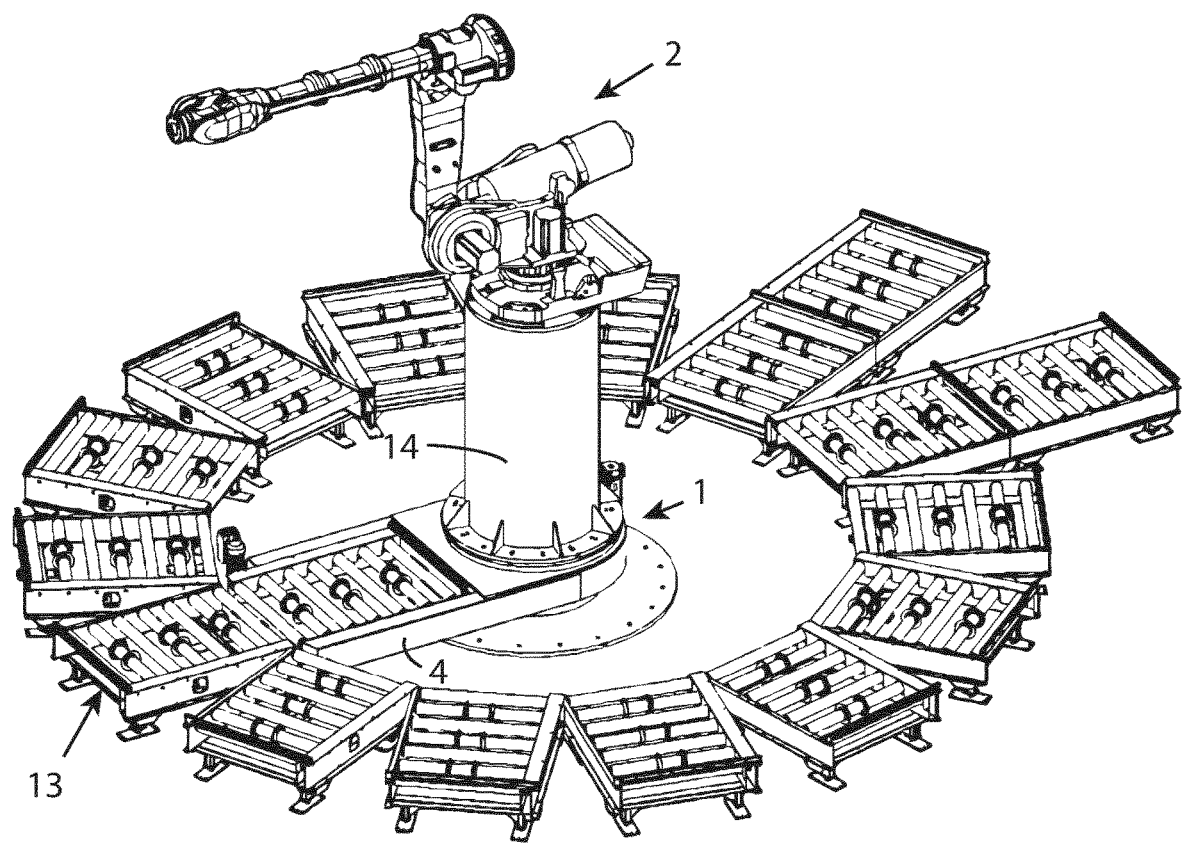
FIG. 13 shows the example robot palletizing system of FIG. 12 with an added height adjustment part.

FIG. 13 shows the example robot palletizing system 15 of FIG. 12 with an added height adjustment part 14.

Figure 14:
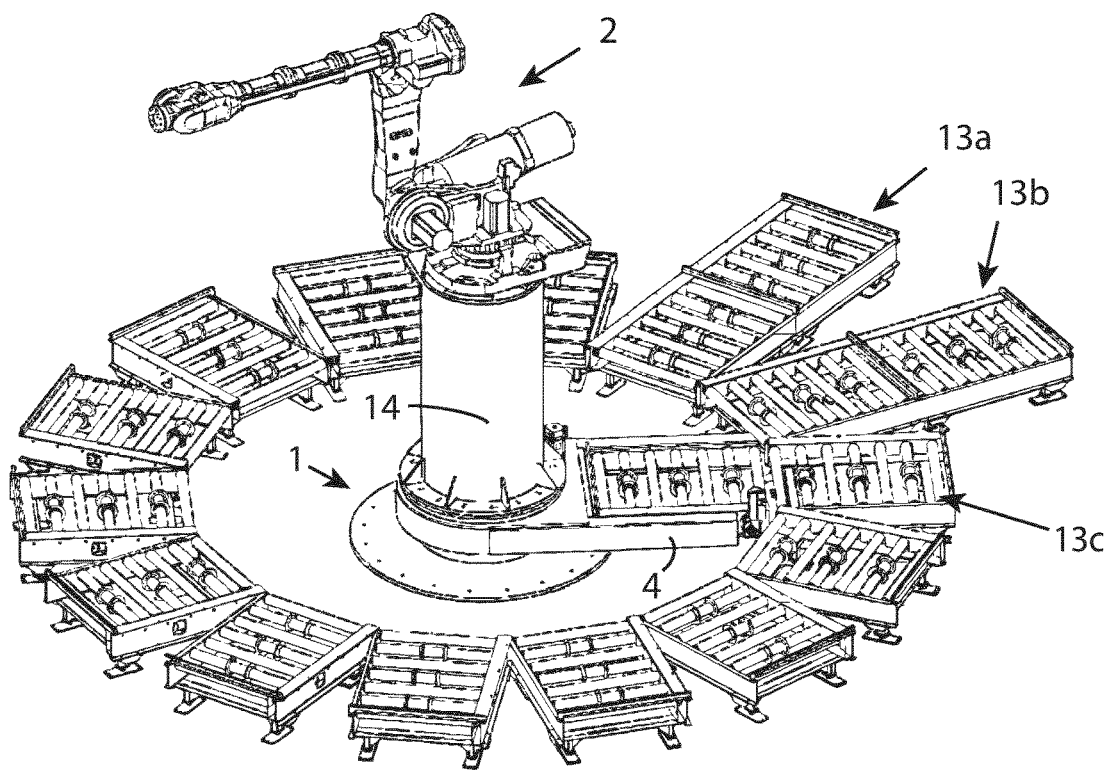
FIG. 14 shows the example robot palletizing system of FIG. 13 in another position of the platform of the pallet transfer device.

FIG. 14 shows the example robot palletizing system 15 of FIG. 13 in another position of the platform 4 of the pallet transfer device 1. Here, the platform 4 has been turned to engage with another second conveyor 13, such as one of pallet support conveyors 13c.

Figure 15:
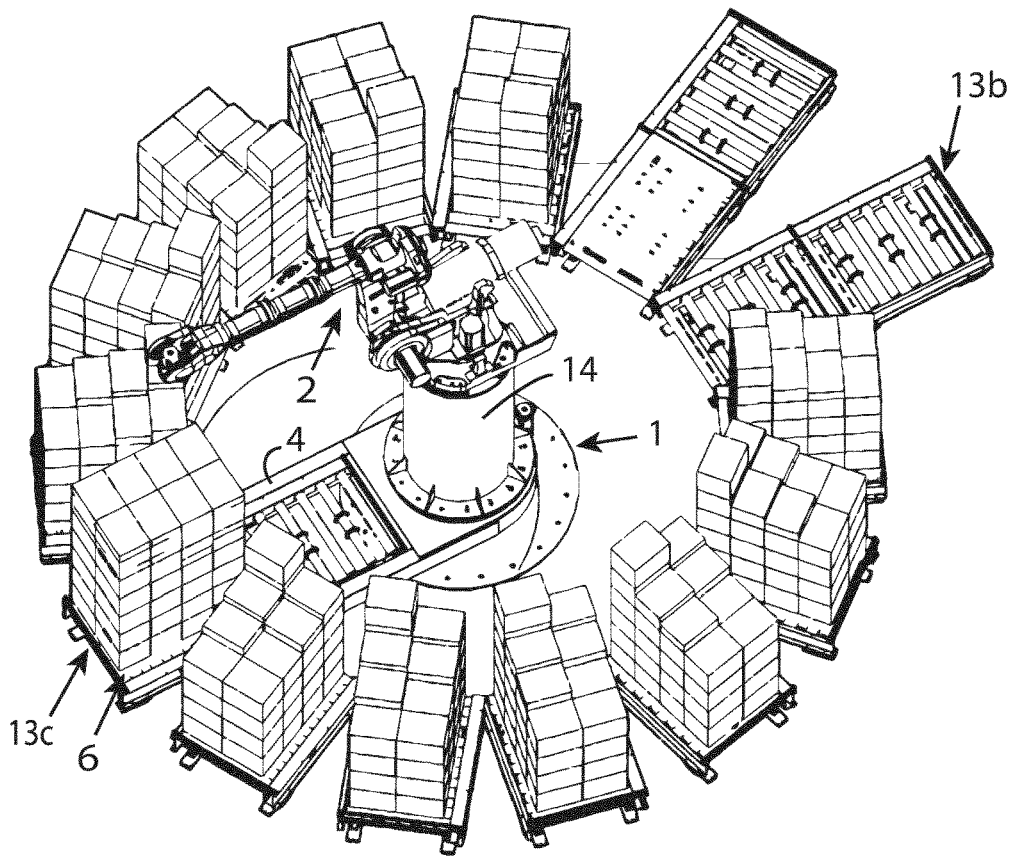
FIG. 15 shows an example robot palletizing system where the pallet transfer device is to load a pallet with loaded packages.

FIG. 15 shows the example robot palletizing system 15 where the pallet transfer device 1 is about to load a pallet 6 filled with articles, such as packages, to the platform 4. The robot 2 has finished loading articles to the pallet 6 in question, and the platform 4 is to be used to move the full pallet to the outgoing conveyor 13b. The platform 4 of the pallet transfer device 1 has been rotated so that the outer end of the platform faces the pallet support conveyor 13c supporting the pallet 6. The conveyor 5 of the platform 4 is used to move the pallet 6 to the platform 4. The conveyor 5 moves the pallet 6 in a reverse direction towards the inner end of the platform during loading of the pallet 6.

Figure 16:
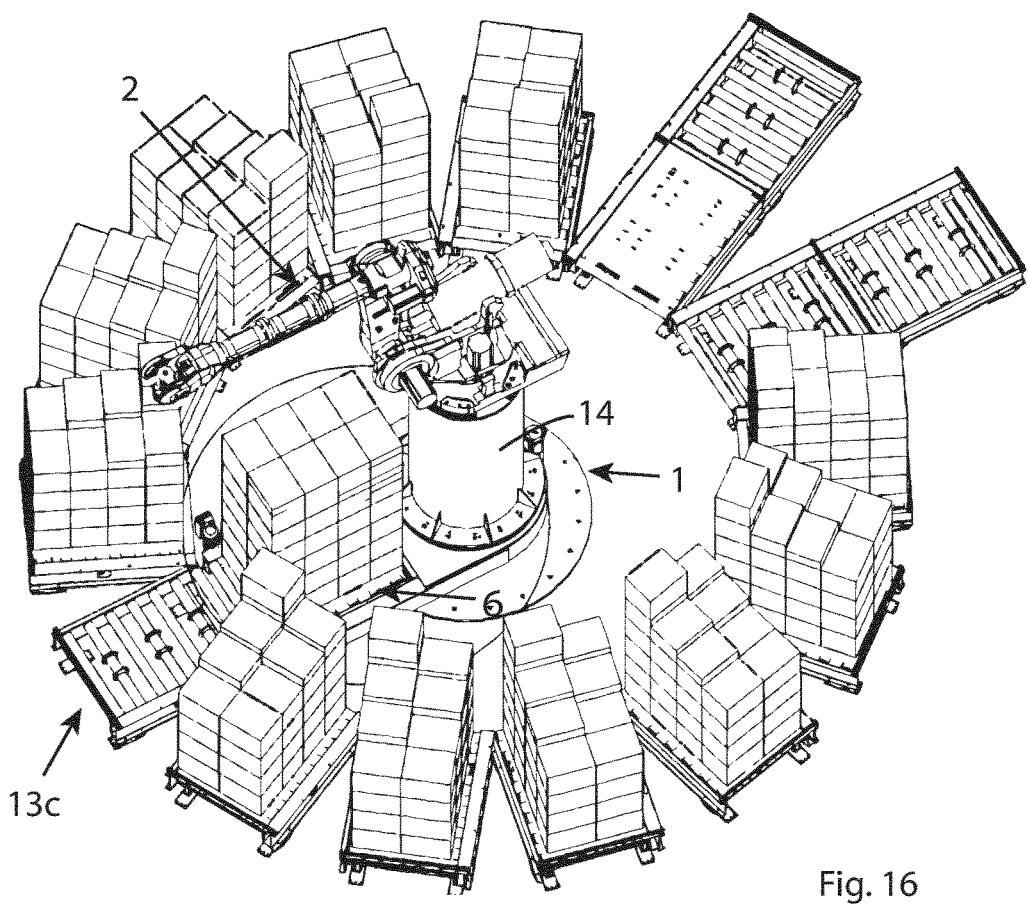
FIG. 16 shows the example robot palletizing system of FIG. 15 when the platform of the pallet transfer device has loaded the pallet.

FIG. 16 shows the example robot palletizing system 15 when the conveyor 5 has loaded the pallet 6 to the platform 4 of the pallet transfer device 1.

Figure 17:
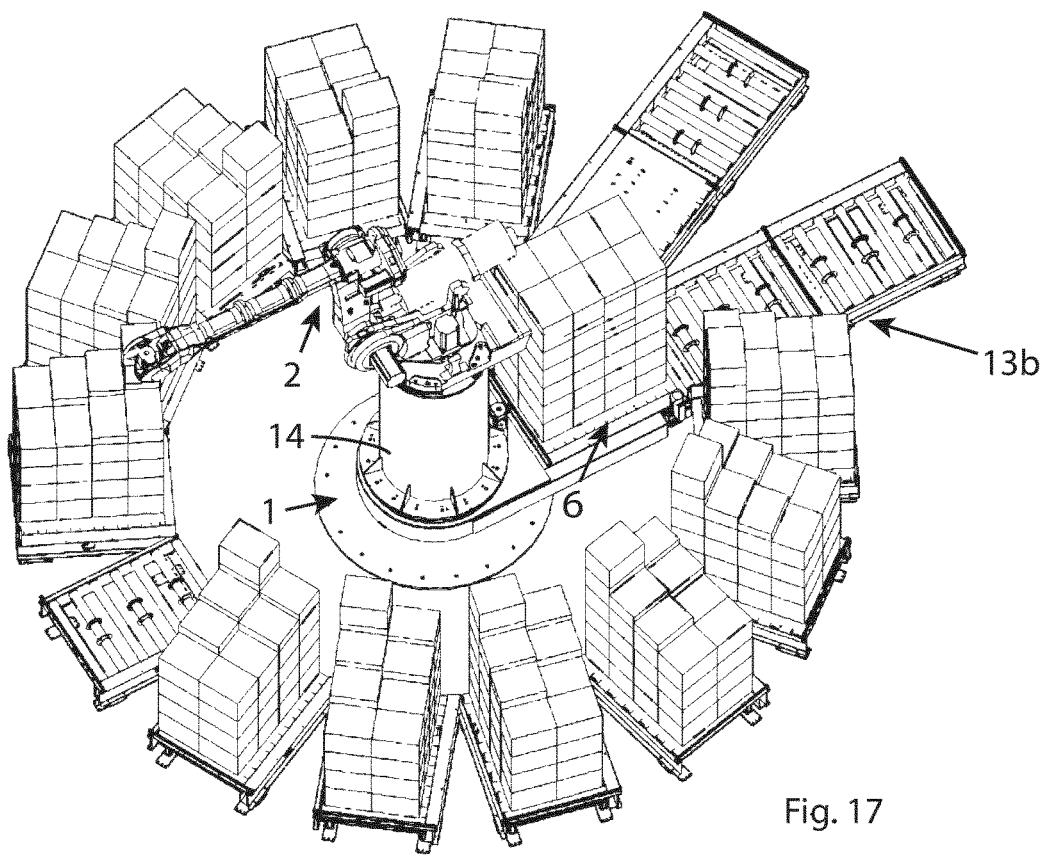
FIG. 17 shows the example robot palletizing system of FIG. 16 when the platform of the pallet transfer device has been turned to onload the pallet on a different second conveyor.

FIG. 17 shows the example robot palletizing system 15 when the platform 4 of the pallet transfer device 1 has been rotated so that the outer end of the platform faces the outgoing conveyor 13b. The conveyor 5 of the platform is used to move the pallet 6 to the outgoing conveyor 13b. The conveyor 5 moves the pallet 6 in a forward direction towards the outer end of the platform 4 during unloading of the pallet.

In FIGS. 12 to 17, the pallet transfer device 1 may comprise the coupling device 11 according to above so that the conveyor 5 of the platform 4 can form a joint conveyor with the second conveyor 13 when the outer end 4a of the platform 4 faces the second conveyor 13. In other words, the conveyor 5 of the platform 4 can form a joint conveyor with each second conveyor 13a, 13b, 13c individually.

In an alternative embodiment, each of the second conveyors 13 may also comprise a coupling device arranged to engage and disengage with the coupling device 11 of the conveyor 5 of the platform 4 so that the conveyor 5 of the platform 4 can form a joint conveyor with the second conveyors 13 when the outer end 4a of the platform 4 faces the second conveyor 13.

An alternative is that each second conveyor 13 comprises a coupling device 11 according to FIGS. 5 to 9. In such a case, there is no need for a coupling device 11 arranged on the platform 4. However, it is advantageous to have the coupling device 11 arranged on the platform 4 so that there is only need for one, instead of one on each second conveyor. Also, the control unit 12 can control the coupling device 11 arranged on the platform 4. Such control on the second conveyors 13 requires more cabling or wireless receivers of signals from the control unit 12 on each second conveyor.

The robot palletizing system needs an actuator for driving the joint conveyor. This actuator can be arranged on the platform or in connection to each of the at least two second conveyors. The actuator may thus either be arranged on the platform or in connection with each of the second conveyors. Preferably, the second actuator 10 of the pallet transfer device is arranged to drive the joint conveyor. It is advantageous if the actuator for driving the joint conveyor is arranged on the platform 4 of the pallet transfer device 1 since then only one single actuator is needed for actuating the conveyor of the pallet transfer device as well as the second conveyors. The second conveyors 13 can be arranged on stationary platforms. In such a case, the second actuator 10 may be arranged on the stationary platform.

The conveyor 5 of the platform 4 and the second conveyors 13 can, for example, be roller conveyors, belt conveyors, or chain conveyors. It is not necessary that the conveyor 5 of the platform 4 and the second conveyors 13 are of the same kind. A pallet 6 is to be loaded or onloaded to or from the platform 4 from or to the second conveyors 13 and that may be done even if the conveyor types are different as long as they can hold a pallet. In the case where the conveyors can form joint conveyors as explained above, it is preferable that the conveyors are of the same type.

The robot palletizing system may comprise a pallet wrapping machine, wherein at least one of the at least two second conveyors 13 is partly arranged under the pallet wrapping machine. A pallet 6 that has been loaded with packages by the robot 2 on one of the second conveyors 13 may then be moved by the pallet transfer device 1 to the second conveyor 13 comprising the pallet wrapping machine for wrapping the pallet with the packages. The second conveyor 13 being partly arranged under the pallet wrapping machine may be where the packaged pallets are retrieved from the palletizing station including the palletizing system.

In the figures, the conveyors 5, 13a, 13b, 13c are all illustrated as roller conveyors. However, they may also be, for example, belt conveyors or chain conveyors. Any conveyor that can be used to load and onload pallets to and from the platform 4 is possible. The type of conveyor can be chosen depending on the type of pallets to be transported.

An example of a method for robot palletizing using the system for robot palletizing 15 is explained with reference to the FIGS. 12-17. A plurality of second conveyors 13a-c are arranged around the pallet transfer device 1 and the robot 2, as shown in FIG. 12. A plurality of empty pallets 6 are placed on the pallet support conveyors 13c arranged around the robot 2. Preferably, the empty pallets are supplied to the system on the ingoing conveyor 13a and transferred to the pallet support conveyors 13c by means of the pallet transfer device 1.

The robot 2 is controlled so that the robot is loading articles to the pallets 6 positioned on the second conveyors 13c arranged around the robot 2, as shown in FIG. 15. When a pallet has been fully loaded with articles, the movable platform 4 is moved in a circumferential direction around the robot so that the outer end 4a of the platform faces the fully loaded pallet 6, as shown in FIG. 15. The conveyor 5 on the movable platform 4 is controlled so that the pallet 6 is moved onto the movable platform 5 by means of the conveyor 5, as shown in FIG. 16. The conveyor 5 moves the pallet in a direction towards the inner end of the platform until the pallet has been loaded to the platform.

The platform 4 with the pallet 6 is moved in a circumferential direction around the robot 2 so that the outer end 4a of the platform faces another of the second conveyors 13, for example the outgoing conveyor 13b as shown in FIG. 17. The conveyor 5 on the movable platform 4 is controlled so that the pallet 6 is unloaded from the platform and moved to the outgoing conveyor 13b. The conveyor 5 moves the pallet 6 in a direction towards the outer end of the platform until the pallet has been moved from the platform onto the conveyor 13. In the same way, an empty pallet 6 can be transferred from one of the second conveyors 13, for example the incoming conveyor 13a, to an empty pallet support conveyor 13c, by means of the movable platform 4 and the conveyor 5 on the platform.

The present invention is not limited to the embodiments disclosed but may be varied and modified within the scope of the following claims. For example, the pallet transfer device may include two platforms for moving pallets in a circumferential direction around the central body, wherein each of the platforms has an inner end rotatably connected to the central body and an outer end facing away from the central bod, and each of the platforms comprises a conveyor for loading and unloading the pallets to and from the platform. Further, the different parts of the pallet transfer device may have different shapes than illustrated in the drawings. Also, the type of robot used on the pallet transfer device is not limited to the one illustrated in the drawings. Any kind of palletizing capable robot can be used. In an alternative embodiment, the platform can be connected to the central body so that rotational axis of the platform and the moving direction of the conveyor are coplanar.

REFERENCE LIST

1. Pallet transfer device
   b. Fastening member
   c. Fastening arrangement
2. Robot
   a. base of the robot
3. Central body
   a. Upper end
   b. Lower end
   c. Envelop surface
4. Platform
   a. Platform outer end
   b. Platform inner end
   c. First arm
   d. Second arm
5. Conveyor
   a. transport mechanism
   b. rolls
   c. rolls of the second conveyor
6. Pallet
7. Bearing
8. Ring-shaped element
9. First actuator to rotate platform
10. Second actuator for conveyor
11. Coupling device
    a. Fastening device
    b. wheel
12. Control unit
13. Second conveyors
    a. ingoing conveyor
    b. outgoing conveyor
    c. pallet support conveyer
14. Height adjustment part
15. System for robot palletizing
A1 Rotational axis of the platform
R1 First rotational axis of the robot

The invention claimed is:

1. A pallet transfer device for robot palletizing, comprising:
   a central body for supporting a robot performing work on pallets, including at least one of loading or unloading articles to or from the pallets, and
   a movable platform rotatably connected to the central body such that the platform is movable in a circumferential direction around the central body, and the movable platform comprises a conveyor for loading and unloading pallets to and from the platform, wherein the pallet transfer device comprises a first actuator arranged to actuate the rotational motion of the platform around the central body, and a second actuator arranged to drive motion of the conveyor, and
   wherein the platform comprises a coupling device arranged at an outer end of the platform for coupling the conveyor to a second conveyor, and the coupling device is arranged to engage and disengage with the second conveyor so that the conveyor of the platform forms a joint conveyor with the second conveyor when the outer end of the platform faces the second conveyor.

2. The pallet transfer device according to claim 1, wherein the movable platform has an inner end rotatably connected to the central body and an outer end facing away from the central body, and the conveyor is arranged for loading and unloading the pallets at the outer end of the platform.

3. The pallet transfer device according to claim 1, wherein the conveyor is arranged for linearly moving the pallets in forward and reverse directions on the platform during unloading and loading of the pallets.

4. The pallet transfer device according to claim 1, wherein the conveyor is arranged for moving the pallets in a radial direction with respect to the central body during loading and unloading of the pallets.

5. The pallet transfer device according to claim 1, wherein an upper end of the central body is provided with a fastening member for fastening the robot to the central body.

6. The pallet transfer device according to claim 1, comprising a control unit arranged to control the first actuator so that the platform is moved around the central body and stopped at defined radial positions, and to control the second actuator so that the conveyor loads and unloads the pallets to and from the platform when the platform has been stopped at the defined radial positions.

7. The pallet transfer device according to claim 1, comprising a bearing being arranged between the platform and the central body such that the platform is rotatable with respect to the central body, and the pallet transfer device comprises a ring-shaped element surrounding the central body and arranged rotatable around the central body, the platform is attached to the ring-shaped element, and the bearing is arranged between the ring-shaped element and the platform.

8. The pallet transfer device according to claim 1, wherein the platform is arranged rotatable at least 180° around the central body, and preferably the platform is arranged rotatable at least 270° around the central body.

9. A system for robot palletizing comprising:
a robot configured to perform work on pallets, including at least one or loading or unloading articles to or from the pallets, and
a pallet transfer device, comprising:
a central body for supporting the a robot, and
a movable platform rotatably connected to the central body such that the platform is movable in a circumferential direction around the central body, and the movable platform comprises a conveyor for loading and unloading pallets to and from the platform, wherein the pallet transfer device comprises a first actuator arranged to actuate the rotational motion of the platform around the central body, and a second actuator arranged to drive motion of the conveyor, and
wherein the robot is attached to an upper end of the central body, and
wherein the system further comprises a plurality of second conveyors arranged in different radial positions around the robot, and a control unit configured to control the rotation of the platform so that the platform is movable between each of the second conveyors, and the second conveyors are arranged such that the conveyor on the platform is operable to load and unload pallets to and from the platform when an outer end of the platform faces one of the second conveyors.

10. A system for robot palletizing comprising:
a robot configured to perform work on pallets, including at least one or loading or unloading articles to or from the pallets, and
a pallet transfer device, comprising:
a central body for supporting the a robot, and
a movable platform rotatably connected to the central body such that the platform is movable in a circumferential direction around the central body, and the movable platform comprises a conveyor for loading and unloading pallets to and from the platform, wherein the pallet transfer device comprises a first actuator arranged to actuate the rotational motion of the platform around the central body, and a second actuator arranged to drive motion of the conveyor, and
wherein the robot is attached to an upper end of the central body, and
wherein the platform comprises a coupling device arranged at an outer end of the platform for coupling the conveyor to a second conveyor, and the coupling device is arranged to engage and disengage with the second conveyor so that the conveyor of the platform forms a joint conveyor with the second conveyor when the outer end of the platform faces the second conveyor.

11. The system for robot palletizing according to claim 9, wherein the robot loads and unloads articles to and from the pallets, the conveyor on the movable platform loads and unloads the pallets to and from the movable platform, and the movable platform moves the pallets in a circumferential direction around the robot.

12. A method for robot palletizing using the system according to claim 9, wherein the method comprises:
disposing a plurality of pallets around the robot,
controlling the robot so that the robot is loading or unloading articles to and from the pallets,
moving the movable platform in a circumferential direction around the robot to one of the pallets,
controlling the conveyor on the movable platform so that the pallet is loaded to the movable platform,
moving the movable platform with the pallet in a circumferential direction around the robot to a determined position, and
controlling the conveyor on the movable platform so that the pallet is unloaded from the movable platform when the platform has reached the determined position.

* * * * *